Oct. 6, 1953          E. H. VOELKER          2,654,685
LOCALLY REINFORCED RESIN ARTICLE
Filed April 12, 1949
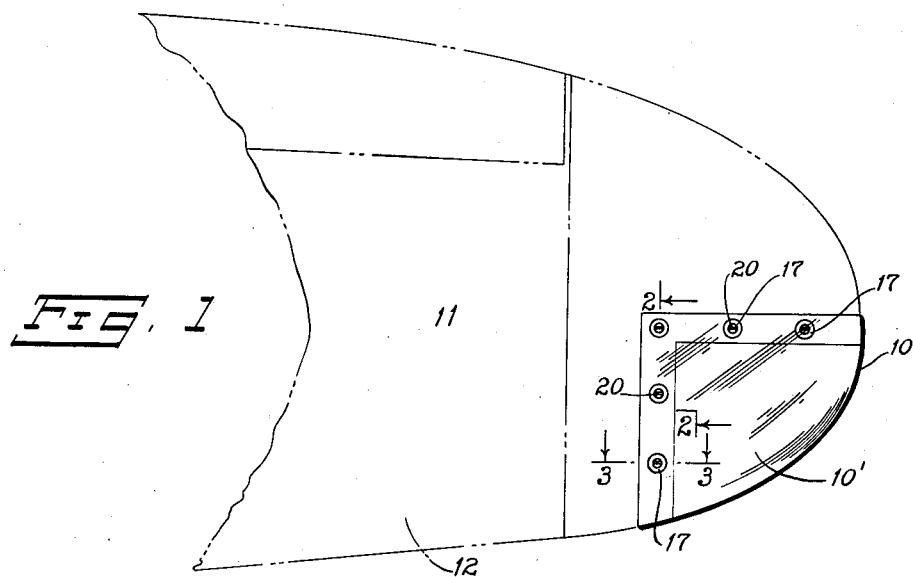
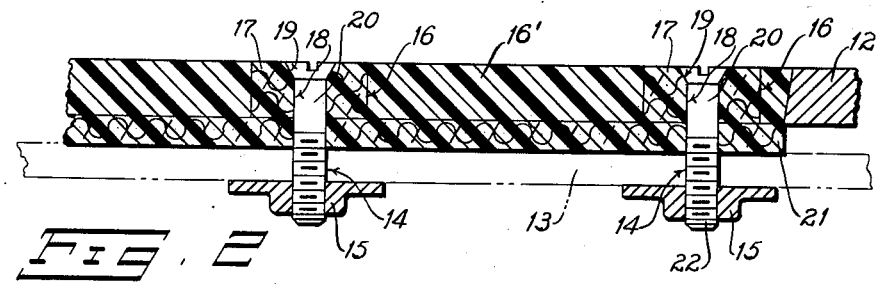
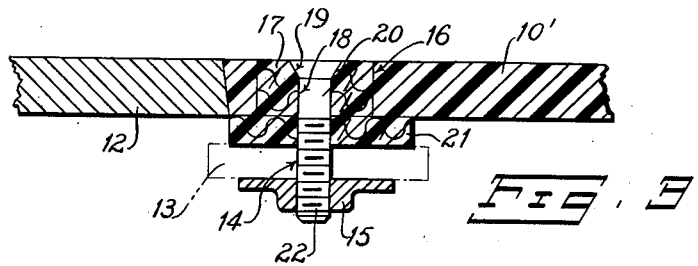
INVENTOR.
Edward H. Voelker
BY
ATTORNEY.

Patented Oct. 6, 1953

2,654,685

UNITED STATES PATENT OFFICE 2,654,685

LOCALLY REINFORCED RESIN ARTICLE

Edward H. Voelker, Huntington Station, N. Y., assignor to Republic Aviation Corporation, Farmingdale, N. Y., a corporation of Delaware Application April 12, 1949, Serial No. 86,973

13 Claims. (Cl. 154—43)

This invention relates to the construction of panels, casings or covers fabricated from suitable and adaptable synthetic resins, such as acrylic resins, and especially relates to the reinforcement of localized areas thereof.

It is proposed by the present invention to so fabricate or form a panel, casing or cover of acrylic or other adaptable resin, that the mounting thereof on a coacting structure will not set up or develop stresses, strains, or unbalanced forces in the resin body and at the same time provide means whereby the panel, casing or cover may be rigidly and securely mounted to resist external or collateral forces and permit it to be repeatedly removed and replaced without injury or damage.

Among its other objects the present invention contemplates localized reinforcements at all points of attachment, as well as along any lines of attachment, that are practically homogeneous and integral with and partake of the characteristics of the synthetic resin of which the panel, cover or casing is made, thereby greatly increasing the strength of the resin at these points to entirely counteract any local tendency of the resin to craze, crack or shatter. Moreover, by confining the pressure or clamping action of the attaching means to these reinforced areas of the panel or cover the resin body thereof beyond the limits of the local reinforcements is protected from the stresses or strains which otherwise would be transmitted to and through the entire resin body.

With the above and other objects in view, as will be apparent, this invention consists in the construction, combination and arrangement of parts, and of the successive steps of the method of fabricating and reinforcing the same, all as hereinafter more fully described, claimed and illustrated in the accompanying drawings, wherein:

Fig. 1 is a plan elevation of a cover or casing made in accordance with the instant invention and mounted in association with the tip and leading edge of an airplane wing to enclose or house a navigation light;

Fig. 2 is a fragmentary longitudinal section taken along line 2—2 of Fig. 1 on the line of attachment of the casing or cover to an underlying structure; and Fig. 3 is a fragmentary transverse section taken along line 3—3 of Fig. 1 through a single point of attachment of the casing or cover to an underlying structure.

While the present invention is of general use in the reinforcement or attachment of panels, covers or casings fabricated of synthetic resins to cooperating structures regardless of their specific shape, function and environment, it is especially designed and intended for use in the construction and reinforcement of casings or covers embodied in airplanes particularly where they may be exposed to substantially the same aerodynamic forces as are the major components of the airplane.

The attachment or mounting of casings, covers or panels made of synthetic resin, usually requires the provision of openings or holes piercing the resin body at appropriate points for the passage of the means of attachment such as screws, bolts, rivets, etc., and it has been determined that the drilling of such holes through the resin body and projecting the attaching and/or fastening means through them has a marked tendency to cause the resin to crack, craze or fracture, particularly when such attaching means exerts a clamping pressure on the resin body or otherwise sets up or develops unbalanced forces or pressures.

It is also recognized to be sound practice in the assembly mounting and securing of any component of an aircraft, to provide a clean, smooth, exposed surface devoid of all projections that would tend to cause turbulence or develop drag. Therefore, the present invention has in view the mounting of transparent casings or covers made of synthetic resins as an exposed element of an aircraft component so that no part of the attaching means, such as, for example, rivets, bolts, and the like, projects beyond the surface of the component or of the cover or casing whereby the surface of the cover or casing will present an unbroken aerodynamic continuation of the surface or skin of the aircraft component with which it is combined. To accomplish this, cavities are provided at all points of attachment for the reception of the heads of the devices used to secure the cover or casing in its operative position to the end that their outer surfaces will not project into the air stream but will rest in the plane of the surface of the resin body.

As has been noted synthetic resins, and more particularly acrylic resins, do not readily lend themselves to the passage of bolts or rivets and are ofttimes adversely affected by any clamping or attaching pressures exerted thereon. Moreover, countersinking the surface of the resin in association with the outer end of each such opening for the passage of fastening or attaching means through the resin can and frequently does aggravate the disadvantages experienced in mounting articles made of synthetic resins.

Because of the inherent characteristics of synthetic resins and particularly those best suited to transparent aircraft parts such as windows, windshields, canopies, etc., e. g., acrylic resins, the subject invention proposes local reinforcements at and in all openings provided for the passage of screws, bolts, rivets, or other fastening and attaching means and along each line of attachment, said reinforcements for all intents and purposes becoming integral or homogeneous with the resin of the part. Furthermore, the reinforcements associated with the openings in the resin can be readily countersunk concentrically without in any way injuring the resin of the panel, cover or casing. To this end each opening provided in the resin of the cover or casing for the passage of attaching means is defined by a restricted, reinforced area the outer faces of which rest in the planes of the opposed surfaces of the panel or cover. This area is, for all practical purposes, integral or unitary with and is a homogeneous continuation of the resin from which the article is fabricated and either surface thereof can be countersunk, or provided with a cavity, in any accepted manner. Where a series of more or less aligned openings for the passage of attaching or fastening means is present, the line of attachment thus created may be and is reinforced throughout its length by a continuous, laminated strip in opposition to the countersunk faces of the reinforced areas defining the attaching openings and comprising an integral or unitary part of the surface of the resin of the casing, panel or cover with which it is associated.

Though the present invention may be used or embodied in any article fabricated of synthetic resin the restricted or limited reinforced areas at points and/or lines of attachment, constituting a principal feature of the present invention, are especially useful in the fabrication and mounting of transparent, synthetic resin members or parts where the general transparency or clarity of the latter will not be reduced or materially affected by the reinforcements.

It will be evident that the subject construction is not limited in its application to any particular article made of synthetic resin but can be applied with equal facility to articles of any shape, contour or size and employed for any purpose or function. To illustrate a representative application or adaptation thereof, a transparent cover or casing for the navigation light of an airplane located at a wing tip has been selected as an example.

Reference being had more particularly to the drawing 10 designates a cover or casing fabricated of transparent acrylic resin. This cover is here illustrated as located at the tip of the wing 11 and incorporated in the leading edge thereof to enclose the navigation light usually located at that point. A casing or cover 10 of this type forms a continuation of the wing and therefore, is hollow and generally U-shaped in section whereby the opposed surfaces 10' thereof can rest in the planes of and respectively form coplanar continuations of the top and bottom skins 12 of the wing. The internal structure of the wing 11 where the cover or casing 10 is to be located, is so constructed or modified that the space enclosed by the casing or cover is defined on two sides viz; the sides thereof adjoining the main body of the wing by ribs, spars or similar elements 13 disposed under the skin 12 of both the upper and lower surfaces of the wing.

This modification or construction of the wing tip forms no part of the present invention beyond providing a coacting structure for the support and attachment of the cover fabricated in accordance with this invention. Manifestly, any type of support or supporting structure may be provided so long as it includes complemental means for coacting with the fastening or attaching means piercing the panel, casing or cover made as taught herein and to be associated with the selected supporting or mounting structure.

These ribs or spars 13 are pierced at intervals by the apertures 14, and positioned on the inner surface of each such rib or spar 13 in registration with each aperture 14 is provided a plate nut 15 riveted or otherwise fixedly secured flush against the cooperating spar or rib 13.

The edge portions of the top and bottom sides 10' of the cover 10, when the latter is in its operative position, overlie and rest flush against the outer surfaces of the spars or ribs 13 of the wing structure defining the space enclosed by said cover and the outer surfaces thereof form flush continuations of the associated wing skin 12. In alignment with each aperture 14 and plate nut 15 the edge portion of the casing is provided an enlarged or oversized opening 16, within which is seated a washer or button 17 pierced concentrically by a passage 18 for the reception of suitable mounting or attaching means. This passage 18 in the washer or button 17 is in direct registration with the threaded passage of the aligned plate nut 15 so that these two passages in effect constitute a continuation one of the other and of the aligned aperture 14 in the rib or spar 13. At its outer end the button 17 is countersunk, as at 19, concentric to the passage 18 therein for the reception of the head of the mounting screw, bolt or rivet 20. As will be hereinafter more fully described in conjunction with the construction and method of making the casing or cover 10, the button or washer 17 is fully reinforced and in its operative position comprises a homogeneous mass with a surrounding body of synthetic resin from which the cover or casing 10 is made.

Disposed along the edge of the inner surface of each side 10' of the casing or cover 10 is a reinforcing tape or strip 21. This strip is continuous and lies below an entire line or row of openings 16 and the several buttons or washers 17 seated therein along the edge portion of a side 10' of the cover or casing 10. For the passage of the attaching screws, rivets or bolts 20 through this reinforcing strip 21, it is apertured in alignment with the threaded opening of the plate nut 15, the opening 14 in the rib or spar 13 and the opening 18 of each button or washer 17.

From the foregoing it is clear that, when the cover 10 is positioned so that its edge portions overlie the spars or ribs 13 of the wing structure defining the space enclosed by the cover 10, the apertures 18 in the several buttons or washers 17 adjoining the edge thereof and the aligned openings in the reinforcing strip 21 are in registration with the corresponding apertures 14 of the spars or ribs 13. When this alignment or registration is established the screws 20, or other suitable fastening means, may be inserted in and projected through these aligned openings whereby their threaded extremities 22 may engage the internally threaded openings of the plate nuts 15. Each screw 20 may then be threaded inwardly of the plate nut 15 until its head is snugly seated in the countersink 19 in the outer face of the button or washer 17. Thus the button or washer 17 is clamped between the rib or spar 13 on one side and the head of the screw 20 on the other side and the reinforcing strip 21 is disposed and held between the edge portion of the cover 10 and the adjacent surface of the rib or spar 13. All of the clamping or engaging pressures are therefore transmitted to and through the buttons or washers 17 to the reinforcing strip 21 and from it to the rib or spar 13.

In order to combine the several buttons or washers 17 with the adjoining reinforcing tape or strip 21 and both the buttons and strip in an integral and homogeneous assembly with the resin of the casing or cover 10, each button or washer 17 as well as each strip or tape 21 comprises a plurality of layers of fiber glass or cloth laminated and impregnated throughout with the same resin as that used in the fabrication of a cover or casing 10. In this manner each button or washer 17 consists of a plurality of fiber glass or cloth layers laminated and impregnated throughout with acrylic resin having a thickness when cured substantially equal to the thickness of the sides 10', of the cover 10. The tape or strip 21 also consists of a plurality of fiber glass layers laminated with acrylic resin to any desired thickness.

Before the buttons or washers 17 and the reinforcing strips 21 are assembled in their operative positions they are first immersed in a cement consisting of acrylic resin (the resin from which the casing or cover 10 is fabricated), dissolved in a suitable solvent such as acetone. Thus, the resin of the buttons 17 and tape 21 as well as the abutting surfaces of the cover 10 are softened by the aforesaid cement, and as the solvent of the cement evaporates there is an intermingling of the resins of the buttons and tape with each other and with the resin of the cover at all points of contact. This results in a unitary and homogeneous mass or body of resin in the cover 10, restricted areas of which, i. e., those areas receiving the pressures, stresses and strains of attachment, are laminated with and reinforced by fiber glass cloth.

It becomes evident from the foregoing that since the buttons or washers 17 are in effect integral and homogeneous with the resin of the body of the cover they constitute isolated and limited reinforced areas having their faces situated in and flush with the opposed surfaces of the associated wall of the cover. Being reinforced and having a much greater diameter than that of the concentric passage 18 provided in the button or washer for the projection of the screw 20 therethrough, all attaching pressures and forces are confined to the button or reinforced area. Since the button or washer 17 is reinforced as aforesaid throughout its mass it may be countersunk, as at 19, not only wihout damage to it but also without injury to the resin body of the cover 10.

The reinforcing tape or strip 21 becomes not only integral with the inner surface of the edge portion of the cover 10 but also becomes integrally a part of each button or washer 17. This reinforces the entire line of attachment and additionally, supports each button or washer 17 in its operative position, if by chance the edge of any button 17 should fail to entirely adhere to and become one with the edge of the opening 16 in which it is seated.

Moreover, the provision of integral and homogeneous reinforced areas in the cover 10 in no way interferes with visibility through the major portion of the cover.

The method and process that can be employed in fabricating the casing or cover 10 to incorporate therein the features of this invention, is as follows:

First: The transparent cover 10 is formed to the required shape by following any applicable technique. In the example shown it is generally U-shaped in section and forms a continuation of the top and bottom skins 12 of the wing 11 as well as the leading edge and tip thereof as illustrated in Fig. 1. It may, however, have any desired shape and form and if desired, can be merely a flat or curved panel.

Second: The cover 10, after formation, is pierced at spaced and selected intervals along its edge portions with small pilot openings which, when the cover or casing is in its operative position, respectively, align with the openings 14 of underlying ribs or spars 13 and with the openings in the plate nuts 15 thereon.

Third: Using these pilot openings as guides and centers the enlarged openings 16 are formed at all points of attachment for the reception of the buttons or washers 17.

Fourth: In the meantime layers of fiber glass cloth are assembled one on the other and are thoroughly impregnated with acrylic resin dissolved in acetone or other volatile solvent to form a large sheet having the approximate thickness of a finished button or washer 18, i. e., the thickness of the resin of the wall 10' of the cover 10. After this laminated sheet is fully cured a plurality of washers are cut therefrom, each washer having a small pilot hole formed centrally therein for alignment with an aperture 14 of the coacting rib or spar 13.

Fifth: The washers or buttons are then immersed in the cement formed of acrylic resin dissolved in acetone, or other volatile solvent, until its exposed surfaces, including its edge, are thoroughly impregnated with this cement and thereby become softened, whereupon the buttons 17 are individually inserted in the several enlarged openings 16 provided along the edge portions of the cover 10 for the reception thereof. It may be advantageous to prepare the opening 16 prior to the insertion of the buttons or washers 17 therein, by treating the edge thereof with the aforesaid cement.

Sixth: The tape or reinforcing strip is also fabricated by impregnating one or more laminations of fiber glass cloth with the aforesaid cement, consisting of acrylic resin and a suitable volatile solvent, such as acetone, whereupon the strip or tape 21 may be applied to the inner surface of each edge portion of the cover or casing 10 to underlie the several buttons or washers 18 situated therein.

Seventh: Clamping pressure may then be applied to the edge of the casing or cover 10 and the reinforcing strip or tape 21, as well as between the buttons or washers 17 and the reinforcing strip or tape 21.

Eighth: The assembly is allowed to cure while the aforesaid pressures are maintained thereon with the result that the reinforcing strips or tapes 21 and the acrylic resin of the cover or casing 10, and also the washers or buttons 17 merge to produce an integral, unitary homogeneous mass of acrylic resin, localized or restricted areas of which viz: the buttons or washers 17 and the reinforcing strips or tapes 21, are reinforced by the inclusion of the laminations of fiber glass cloth or similar woven material; and Ninth: The pilot opening in each button or washer 17 is enlarged to the diameter of the screw, bolt, rivet or other fastening means 22 to be received therein, and the outer face thereof is concentrically countersunk, as at 19, to provide the recess or cavity for the snug and complete reception of the head of the bolt, rivet or screw 22. In this manner the outer surface of the cover or casing 10 constitutes a flush continuation of the adjacent skin 12 of the wing and no projections are present at the points of attachment of the cover or casing.

In the disclosure of one adaptation of the present invention, screws are shown as attaching the cover or casing 10 to the ribs or spars 13, and the countersink 19 in each washer or button 17 is designed to receive the head of this screw. It is of course to be understood that any other suitable type of attaching means may be employed and that the countersink at the outer extremity of each passage 18 of the button or washer 17 is to conform exactly to the head of the attaching element so that it will be received completely within the countersink 19 with its outer surface lying in the plane of the outer surface of the button or washer 17.

Manifestly, all of the attaching forces are exerted through the buttons or washers 17 and the reinforcing strips or tapes 21 and that these elements are reinforced by the inclusion therein of layers or laminations of fiber glass cloth or equivalent woven material. The impregnation of the fiber glass cloth or its equivalent, with the same resin as is used in the fabrication of a cover or casing 10 causes the adjoining faces of the strips or tapes 21 and the surface of the cover or casing 10 to merge into a unitary and homogeneous mass and this is also true where the edge of the washer or button 17 contacts and merges with the wall of the aperture 16 and between the face of the button or washer 17 and the adjoining surface of the tape or reinforcing strip 21. Thus, regardless of the fabrication of the structure the resulting assembly, for all practical purposes, becomes a single, homogeneous mass of acrylic resin with portions or restricted areas thereof reinforced by fiber glass cloth or equivalent woven material.

What is claimed is:

1. An article fabricated of acrylic resin embodying spaced, reinforced areas isolated one from the other and comprising integral parts of the resin body of the article, each of said reinforced areas extending completely through the resin body and terminating in the planes of the surfaces of said body.

2. An article fabricated of acrylic resin embodying a plurality of spaced internally reinforced areas, each area consisting of layers of woven material laminated with acrylic resin forming an integral and homogeneous continuation and part of the adjacent acrylic resin body of the article and extending completely through the resin body with its ends coplanar with the surfaces of said body.

3. An article fabricated of acrylic resin embodying a reinforced area entirely surrounded by the resin of the article and comprising one or more layers of fiber glass, laminated with acrylic resin integrally united with the surrounding resin of the article to form a unitary, homogeneous acrylic resin structure.

4. An article fabricated of clear, acrylic resin embodying relatively independent reinforced areas, each area being entirely surrounded by the resin of the article and comprising one or more layers of fiber glass cloth laminated with acrylic resin united with the adjoining end surrounding resin of the body of the article in integral and unitary association.

5. An article fabricated of synthetic resin and provided with over-size openings spaced regularly one from the other therein in combination with a button consisting of woven fabric laminated with the same resin as that of the article seated in and completely filling each opening, said button having substantially the thickness of the resin of the body of the article defining the opening and a centrally disposed relatively small aperture for the passage of fastening means through the button.

6. An article made of synthetic resin provided with one or more relatively large openings piercing and defined by the resin body of the article, in combination with a reinforced button positioned in and completely filling each opening with its surfaces situated in the planes of the opposed surfaces of the resin body of the article, the edge of each button being integrally united with the wall of the opening in which it is positioned.

7. An article made of synthetic resin provided with one or more relatively large openings piercing and defined by the resin of the article, in combination with a reinforced button positioned in and completely filling each opening with its surfaces respectively situated in the planes of the opposed surfaces of the resin body of the article, each button comprising one or more layers of fiber glass cloth laminated with the same resin as, and united integrally with, the resin of the article.

8. An article made of synthetic resin provided with one or more relatively large openings piercing and defined by the resin body of the article, in combination with a reinforced button positioned in and completely filling each opening with its surfaces respectively disposed in the planes of the opposed surfaces of the resin body of the article surrounding the coacting opening, each button comprising one or more layers of fiber glass cloth laminated with the same resin as, and united integrally with, the resin of the article, pierced centrally by an opening terminating at one end in a countersunk cavity.

9. An article made of synthetic resin provided with one or more relatively large openings piercing the resin body of the article, in combination with a reinforced button positioned in and completely filling each such opening with its surfaces respectively situated in the planes of the opposed surfaces of the resin body of the article defining the coacting opening, each button comprising one or more layers of fiber glass cloth laminated with the same resin as, and united integrally with, the resin of the article, and a tape consisting of one or more layers of fiber glass cloth laminated with the same resin as that of the body of the article and situated in flush contact with one surface of the resin body of the article and with the faces of the button or buttons situated therein, the resin of the tape being united with the resin of the buttons and of the article in an integral and homogeneous assembly.

10. An article made of synthetic resin provided with one or more relatively large openings piercing the resin body of the article, in combination with a reinforced button positioned in and completely filling each opening with its surfaces respectively situated in the planes of the opposed surfaces of the resin body of the article, each button comprising one or more layers of fiber glass cloth laminated with the same resin as, and united integrally with, the resin of the article, and a tape consisting of one or more layers of fiber glass cloth laminated with the same resin as that forming the article positioned in flush contact with one surface of the article and with the faces of the button or buttons located therein, the resin of the tape being united with the resin of the buttons and of the article in an integral and homogeneous assembly, and each button being pierced centrally by a relatively small opening which at one end registers with an opening in the tape and at the other end terminates in a countersunk cavity formed in the face of the button opposed to the tape.

11. A locally reinforced article fabricated of acrylic resin perforated by at least one relatively large opening, in combination with a button of laminated woven fiber glass impregnated with acrylic resin seated and entirely contained within said opening with the resin of the button integrally united with the resin of the article, and a tape of laminated woven fiber glass impregnated with acrylic resin adhered to one face of the article and traversing the button aforesaid, the resin of the tape being integrally united with the resin of both button and article.

12. An article fabricated of synthetic resin embodying regularly spaced, isolated, reinforced areas, comprising integral parts of the resin body of the article, in combination with a continuous tape integrally adhered to the resin of the article in transverse alignment with said reinforced areas.

13. An article fabricated of synthetic resin embodying regularly spaced, reinforced areas extending completely through the body of the article and comprising integral parts of the resin body of the article, in combination with a continuous tape integrally united to the resin of the article and of said reinforced areas, said tape and each of the reinforced areas being pierced by openings for the passage of fastening means.

EDWARD H. VOELKER.

References Cited in the file of this patent

UNITED STATES PATENTS

| Number | Name | Date |
| --- | --- | --- |
| 2,126,833 | Steinberger | Aug. 16, 1938 |
| 2,285,679 | Pontius | June 9, 1942 |
| 2,300,506 | Kamerer | Nov. 3, 1942 |
| 2,350,887 | Goff | June 6, 1944 |
| 2,374,057 | Watkins | Apr. 17, 1945 |
| 2,392,129 | Downes | Jan. 1, 1946 |
| 2,444,059 | Neher et al. | June 29, 1948 |
| 2,458,032 | Simon | Jan. 4, 1949 |
| 2,464,826 | Neher et al. | Mar. 22, 1949 |
| 2,511,168 | Martin et al. | June 13, 1950 |
| 2,565,753 | Botwinick | Aug. 28, 1951 |

OTHER REFERENCES

"Lucite" Manual by Du Pont, November 1942, pp. 76–78.